(12) United States Patent
Barthel et al.

(10) Patent No.: US 8,835,516 B2
(45) Date of Patent: Sep. 16, 2014

(54) FISCHER TROPSCH PROCESS USING IMPROVED EXTRUDATES

(75) Inventors: Rene Georges Ernst Barthel, Amsterdam (NL); Maria Johanna Wilhelmina Van Wieringen, Amsterdam (NL); Leonardus Maria Van Der Sman, Amsterdam (NL); László Domokos, Amsterdam (NL)

(73) Assignee: Shell Oil Company, Houston, TX (US)

( * ) Notice: Subject to any disclaimer, the term of this patent is extended or adjusted under 35 U.S.C. 154(b) by 315 days.

(21) Appl. No.: 13/327,436

(22) Filed: Dec. 15, 2011

(65) Prior Publication Data

US 2012/0322900 A1   Dec. 20, 2012

(30) Foreign Application Priority Data

Dec. 20, 2010  (EP) .................................. 10195842

(51) Int. Cl.
    *C07C 27/00*        (2006.01)
(52) U.S. Cl.
    USPC .......................................... 518/700; 518/715
(58) Field of Classification Search
    USPC .................................. 518/700, 715
    See application file for complete search history.

(56) References Cited

U.S. PATENT DOCUMENTS

| | | | | |
|---|---|---|---|---|
| 3,857,780 | A | 12/1974 | Gustafson | 208/139 |
| 3,966,644 | A | 6/1976 | Gustafson | 252/455 |
| 2007/0037690 | A1* | 2/2007 | Fenouil et al. | 501/103 |
| 2008/0167180 | A1* | 7/2008 | Van Den Brink et al. | 502/300 |

FOREIGN PATENT DOCUMENTS

| | | | |
|---|---|---|---|
| DE | 10355347 | 9/2004 | ............. B29C 47/30 |
| DE | 102008053799 | 5/2010 | ............. B29C 47/12 |
| EP | 218147 | 4/1987 | ............. B01J 35/02 |
| EP | 291682 | 11/1988 | ............. B29C 45/44 |
| EP | 1042067 | 10/2000 | ............. B01J 23/75 |
| WO | WO03013725 | 2/2003 | ............. B01J 35/02 |
| WO | WO03103833 | 12/2003 | ............. B01J 35/02 |
| WO | WO2005011945 | 2/2005 | ............. B29B 9/06 |
| WO | WO2008087149 | 7/2008 | ............. C10G 2/00 |

OTHER PUBLICATIONS

Ingelgard, Tomas, "European Search Report," European Patent Office. Jul. 27, 2011, Munich, Germany, 6 pages.

* cited by examiner

*Primary Examiner* — Jafar Parsa

(57) ABSTRACT

A process for performing a Fischer Tropsch reaction comprising (a) providing syngas to a reactor, said reactor comprising catalyst particles that have been produced by extruding a paste using a die comprising a plurality of channels extending from an inlet to an outlet, wherein from the inlet to the outlet each channel comprises a first section with a helical bore with a non-circular cross-section, and a second section with a cylindrical bore which has a diameter equal or greater than that of the first section, wherein the second section is at least twice as long as a diameter of the first section; (b) providing the following process conditions in the reactor: a temperature from 125 to 350° C., and a pressure from 5 to 150 bar absolute, and a gaseous hourly space velocity from 500 to 10000 Nl/l/h; and (c) removing Fischer Tropsch product from the reactor.

9 Claims, 6 Drawing Sheets

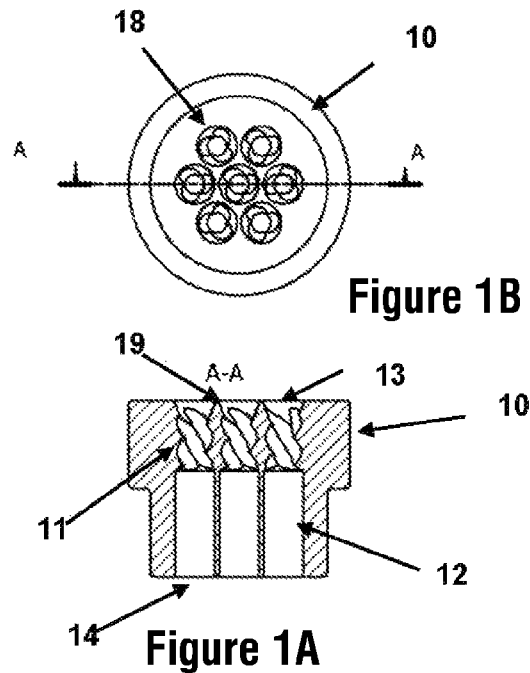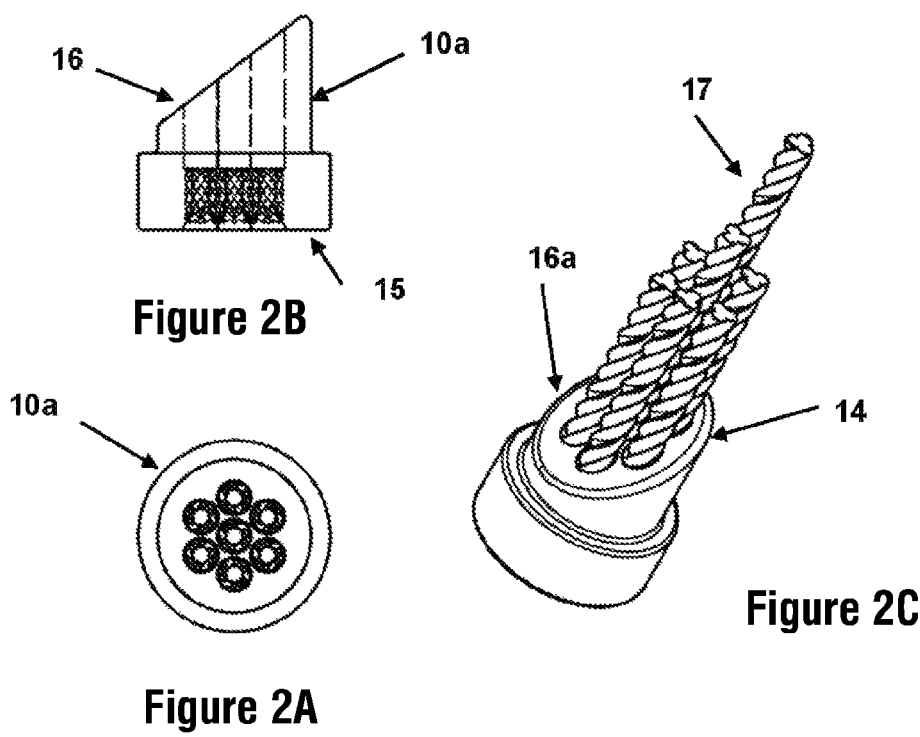

FISCHER TROPSCH PROCESS USING IMPROVED EXTRUDATES

This patent application claims the benefit of EP10195842.9 filed 20 Dec. 2010, which is incorporated herein by reference.

FIELD OF THE INVENTION

The present invention relates to a method for extruding particles and to particles produced with such methods. The invention further relates to a Fischer Tropsch process using the extruded particles.

BACKGROUND OF THE INVENTION

For certain reactions, it is desirable to pass a reaction mixture through a bed of catalyst particles. This is particularly the case for mass-transfer or diffusion limited reactions such as the Fischer-Tropsch process for synthesis of hydrocarbons. In this process, a hydrocarbonaceous feed stock is first converted into a mixture of hydrogen and carbon monoxide known as synthesis gas, or syngas. The synthesis gas is then fed into a reactor, where it is converted into mainly paraffinic compounds in a multiple step process at elevated temperature and pressure over a suitable catalyst. The reaction conditions are generally arranged to favour the production of longer chain hydrocarbons over methane and carbon dioxide.

Known types of Fischer-Tropsch catalysts typically include as the catalytically active component a metal from Group VIII of the Periodic Table (references herein to the Periodic Table relate to the previous IUPAC version of the Periodic Table of Elements as described in, for example, the 68th Edition of the Handbook of Chemistry and Physics published by the CPC Press). Particularly catalytically active metals included ruthenium, iron, cobalt and nickel, with cobalt frequently a preferred choice. In use, the catalytically active metal is preferably supported on a porous catalyst support. The porous catalyst support may be selected from any of the suitable refractory metal oxides or silicates, or combinations of these known in the art. Particular examples of preferred porous catalyst supports include silica, alumina, titania, zirconia, ceria, gallia and mixtures thereof, with silica and titania particularly preferred. An exemplary process for the preparation of such catalyst materials is described in EP-1042067.

For the catalyst to be effective in use, it is desirable to be provided in an appropriate form factor. One way of producing a catalyst material such as described above is to feed a paste comprising a support material and optionally a catalytically active component or a precursor thereof from a hopper or compactor into an extruder. Where the extrusion process is for the formation of a Fischer-Tropsch catalyst, the paste may comprise a catalytically active metal and/or a promoter. A number of dies at the end of the extruder each comprise a plurality of small apertures through which the paste is forced. The resulting extrudate is an elongated catalyst precursor, catalyst or catalyst support suitable for use in a suitable reactor such as, for example, a fixed bed multitubular reactor.

Mass transfer limits the amount of catalyst that can be used in such a reactor, rendering it desirable to increase the surface area of catalyst available. One way to do this is to reduce catalyst size, but this will lead to a denser packing of catalyst and hence a significant pressure drop across the catalyst in use. Such a pressure drop is generally disadvantageous, and multitubular reactors may in practice be unable to tolerate a pressure drop, or a pressure drop variation, above a threshold value. This requires catalyst particles to have dimensions—particularly length and diameter—sufficient to keep the pressure drop within acceptable limits.

A variety of catalyst shapes have been employed in order to provide an increased surface area for a given particle length. The use of trilobe (TL) and other multilobed particles, involving a plurality of cylindrical lobes abutting or overlapping each other, is discussed in U.S. Pat. Nos. 3,857,780 and 3,966,644. The term "trilobe" or TL catalyst is generally used for catalyst particles with a cloverleaf cross-section. A number of further developments on the basic trilobe or multilobe shape have been proposed. Examples are the extreme trilobe (TX) shape disclosed in WO2003/013725 and WO2003/103833 in which the three lobes are cylinders of equal size spaced around another cylinder of equal size which each abut, the asymmetric trilobe (TA) shape disclosed in WO2008/087149 in which the three lobes comprise equal cylinders disposed around a central cylinder as for the TX shape but with a central cylinder larger than the lobes, and a multilobal shape involving a plurality of lobes such that each lobe may be mapped in the cross-sectional plane on to an array of equally sized circles arranged in a regular array such that each circle is abutted by six neighbours (CA shape).

While these shapes do provide increased surface area per unit of catalyst length as compared to a simple cylinder, it is desirable to improve catalyst properties further, particularly with respect to pressure drop. An effective approach to reducing pressure drop further for a given particle length is to provide a helically wound ("rifled") extrudate, as disclosed in EP0218147 for trilobed and multilobed particles. This rifling prevents stacking of catalyst particles, which will lead to greater pressure drop.

In practice, rifled extrudates produced by these processes perform at substantially below theoretical levels of effectiveness. Such extrudates in practice will tend to unwind, and will have a greater than predicted pitch. It is therefore desirable to produce rifled extrudates which more closely approximate the desired physical form to provide reduced pressure drop for a given length of particle.

SUMMARY OF THE INVENTION

In a first aspect, the invention provides a method for extruding particles using a die which is suitable for extruding elongate particles suitable for use in catalysis. The die comprises a plurality of channels extending from an inlet to an outlet, wherein from the inlet to the outlet each channel comprises a first section with a helical bore with a non-circular cross-section, and a second section with a cylindrical bore which has a diameter equal or greater than that of the first section, wherein the second section is at least twice as long as a diameter of the first section.

BRIEF DESCRIPTION OF THE DRAWINGS

FIGS. 1A to 1C show schematically a die for producing extruded products;

FIGS. 2A to 2C show another die for producing extruded products;

DETAILED DESCRIPTION

Figure 3:
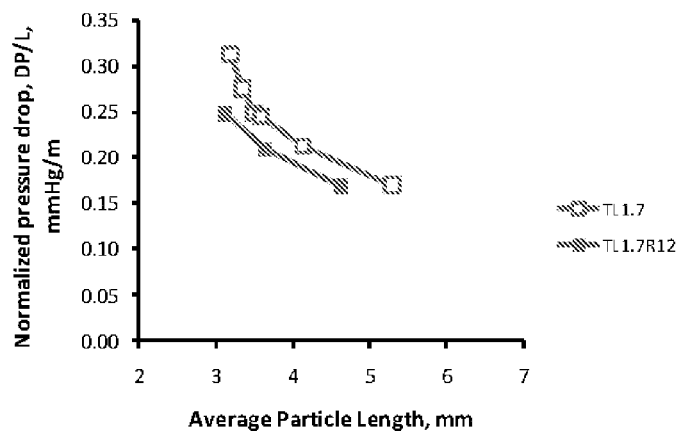
FIG. 3 compares the pressure drop observed in particles produced according to Example 1 and Example 2.

In a first aspect, the invention provides a method for extruding particles using a die which is suitable for extruding elongate particles suitable for use in catalysis. The die comprises a plurality of channels extending from an inlet to an outlet, wherein from the inlet to the outlet each channel comprises a first section with a helical bore with a non-circular cross-section, and a second section with a cylindrical bore which has a diameter equal or greater than that of the first section, wherein the second section is at least twice as long as a diameter of the first section.

The present inventors have identified that at least two factors are present in the loss of "rifled" form when conventional dies are used. Firstly, due to the inherent elasticity of the extruded material, entanglement on extrusion leads to unwinding: the helically wound extrudate bodies lose their original shape, and straighten out losing their rifled character, and the pitch increases in consequence. Secondly, once the entanglement starts, the exit angle of the freshly produces extrudates deviates from the direction imparted by the channels in the die (typically perpendicular to the surface of the die). This deviation in the exit angle reduces the effectiveness of the die channel in imposing the desired helical form on the extrudate, and leads to a helically wound extrudate shape with a lower than intended pitch.

The present inventors have found that it is possible to preserve the original helically wound shape and the intended pitch by providing dies for extrusion with the features indicated above. Providing an extended non-helically wound section in the die as proposed, preferably one with circular cross-section, enables both these identified factors which lead to loss of the intended helical form to be prevented. Using this approach, separation is imposed on the extrudates which means that the entanglement of the freshly produced extrudates can be limited to a minimum level. Moreover, the exit angle of the freshly produced extrudates can be controlled to better conform to a preferred angle—generally this will be perpendicular to the surface of the die, but in embodiments this may be perpendicular to the plane that can be formed by connecting the points of the die channels where the helically bored section of the channels end.

Advantageously, the first section may have a helical trilobal form, preferably selected from helical trilobe (TL), asymmetric trilobe (TA) and extreme trilobe (TX).

Preferably, a length of the first section is at least equal to a pitch of the helical bore. This is desirable to ensure that the extrudate has the intended pitch.

Preferably, the second section is substantially circular in cross-section.

Advantageously, each channel of the die further comprises between the inlet and the first section a tapered inlet section wider at the inlet than at the first section, wherein an angle of taper for the tapered inlet section is between 30 degrees and 60 degrees. This allows a starting mixture to be fed into the die effectively and to pass through it smoothly.

Preferably, each channel is separated from each adjacent channel by a land at both the inlet and the outlet. This helps the extrudate to form without entangling, and makes the inlet and the outlet easier to scrape clean.

Preferably, the diameter of the second sections of the channels is 10 to 50% greater than the diameter of the first section of the channels. This helps the extrudate to better approximate the intended theoretical shape.

Preferably, the inlet forms an inlet plane, and the outlet forms an outlet plane. In some embodiments, the inlet plane and the outlet plane are not parallel.

In some embodiments, the die is provided in two or more modules which may engaged with or detached from each other, such that the first section of each channel is provided in one module and the second section of each channel is provided in another module. The modules may be engaged by aligned pins and recesses, for example. This may enable a helical section to be replaced if it has been blocked without requiring more extensive changes to an extruder.

In a further aspect, there is provided a method of making helically formed extrudate particles for use in catalysis, comprising: providing an extruder with a die as described above; preparing a starting mixture for extrusion; feeding the starting mixture through the die of the extruder; and separating extruded material from the die of the extruder to provide the helically formed extrudate particles.

The helically formed extrudate may be a catalyst material for use in catalysing the Fischer-Tropsch process.

In a further aspect, there is provided a method of carrying out the Fischer-Tropsch process, comprising catalysing one or more reactions of the Fischer-Tropsch process with helically formed extrudate particles prepared by the method described above.

Figure 4:
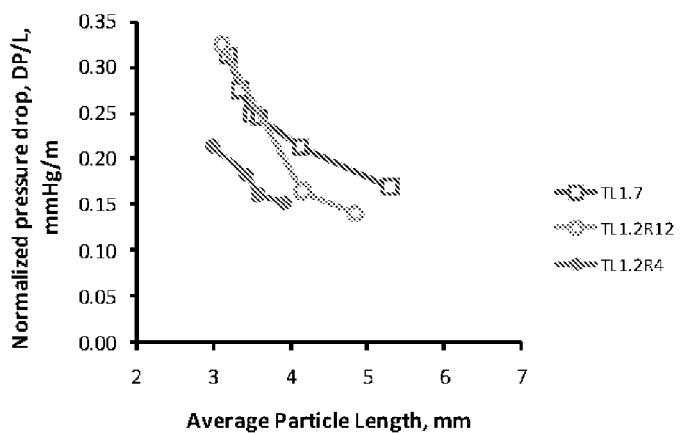
FIG. 4 compares the pressure drop observed in particles produced according to Example 1 and Example 4.
Figure 5:
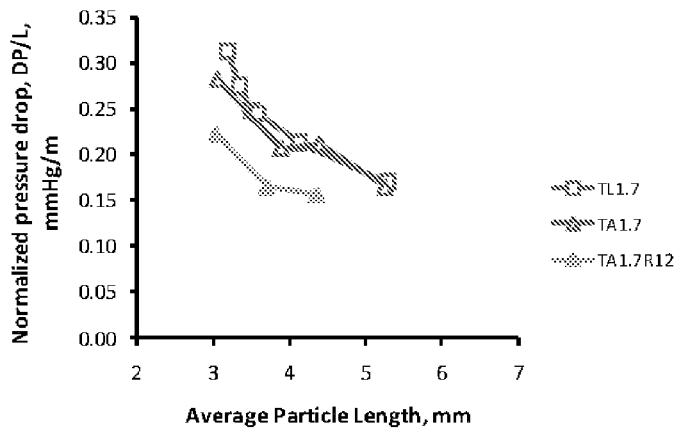
FIG. 5 compares the pressure drop observed in particles produced according to Example 1, Example 6 and Example 7.
Figure 6:
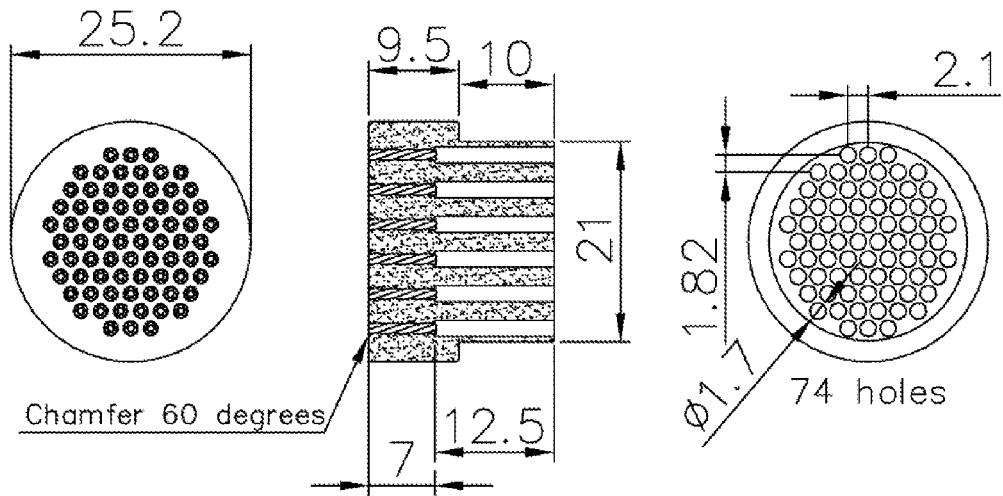
FIG. 6 illustrates an instance of a die for producing extruded particles of the type shown in FIG. 1.
Figure 7:
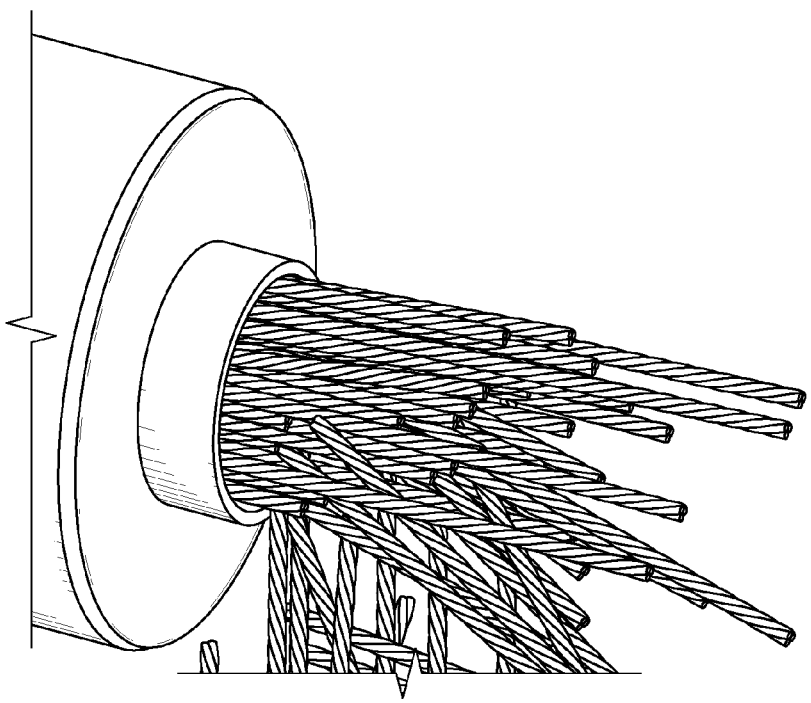
FIG. 7 illustrates an extrusion of particles using a die as shown in FIG. 6.
Figure 8:
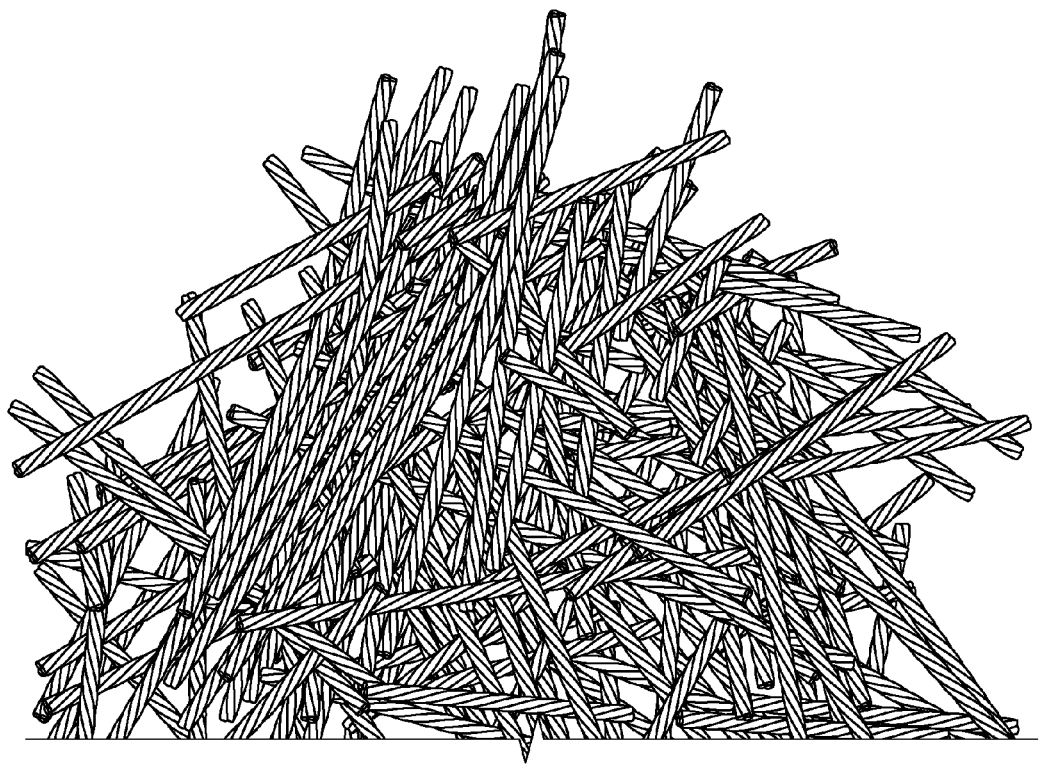
FIG. 8 illustrates an assemblage of particles extruded using a die as shown in FIG. 6.
Figure 9:
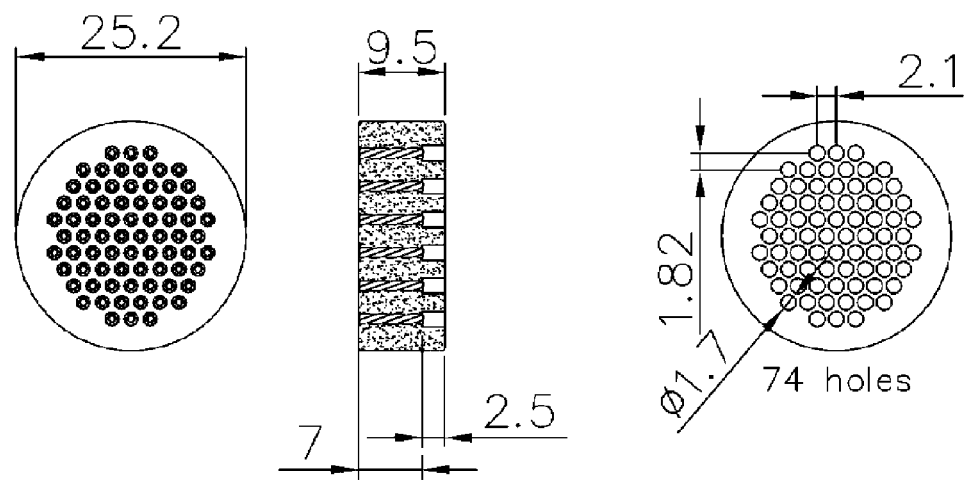
FIG. 9 illustrates an instance of a die that is capable of producing extruded particles but that is not an embodiment of the invention.
Figure 10:
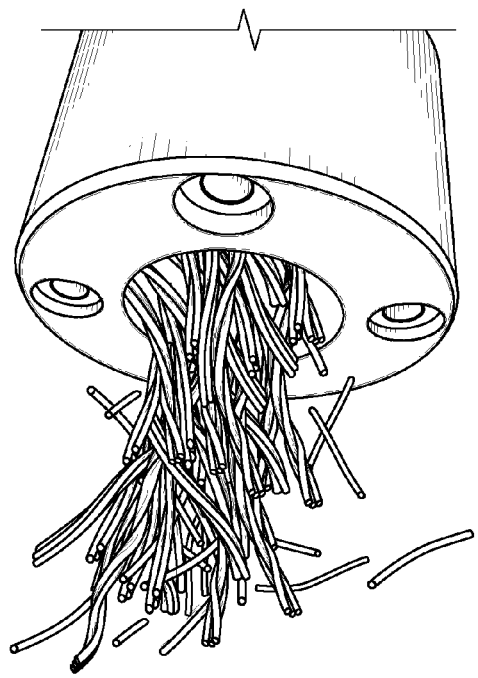
FIG. 10 illustrates an extrusion of particles using a die as shown in FIG. 9.
Figure 11:
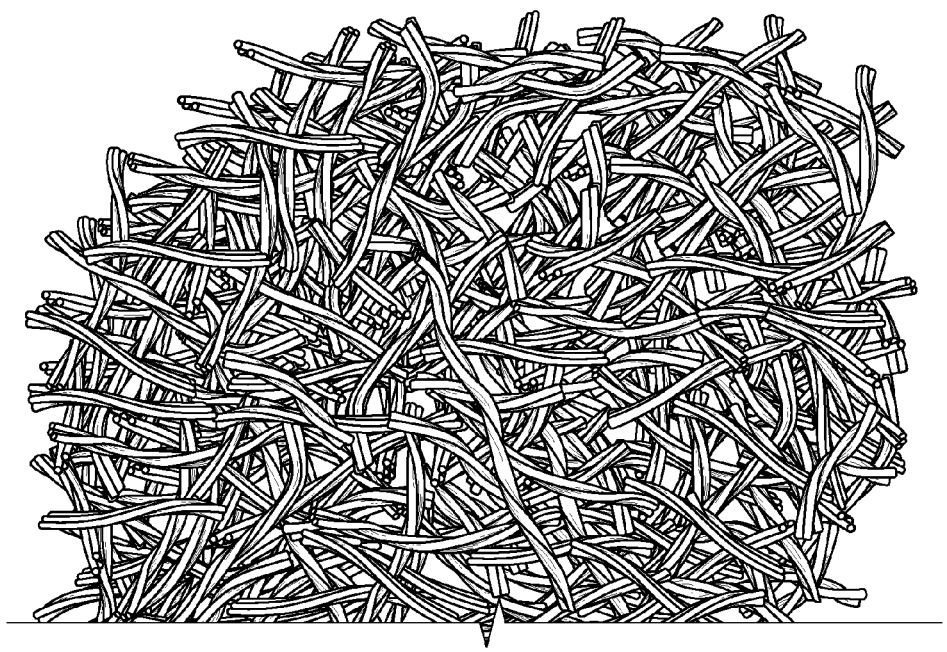
FIG. 11 illustrates an assemblage of particles extruded using a die as shown in FIG. 9.
Figure 12:
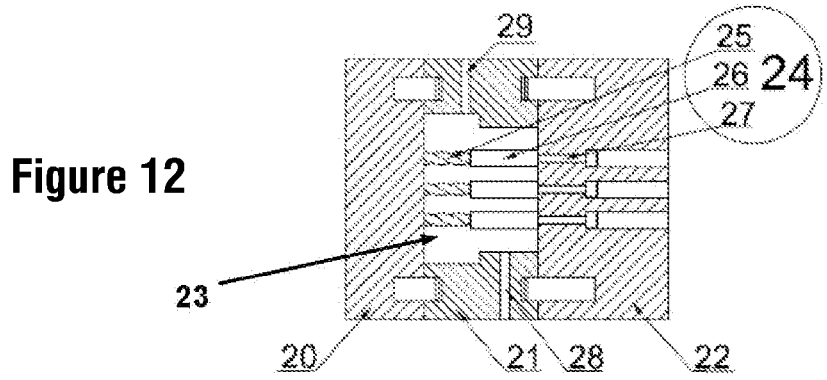
FIG. 12 illustrates an exemplary apparatus for producing a die of the form shown in FIGS. 1 and 2.
Figure 13A:
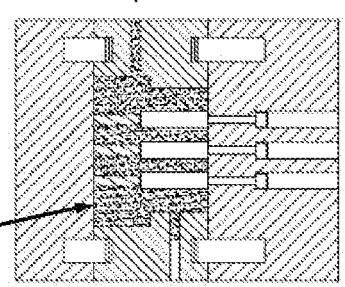
FIGS. 13A to 13C show the production of a die using the apparatus of FIG. 12.
Figure 13B:
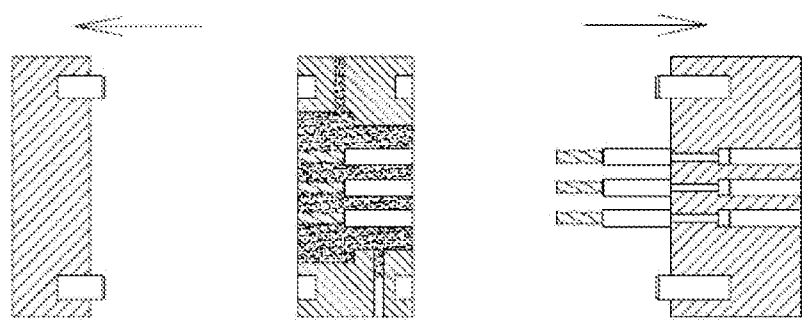
Figure 13C:
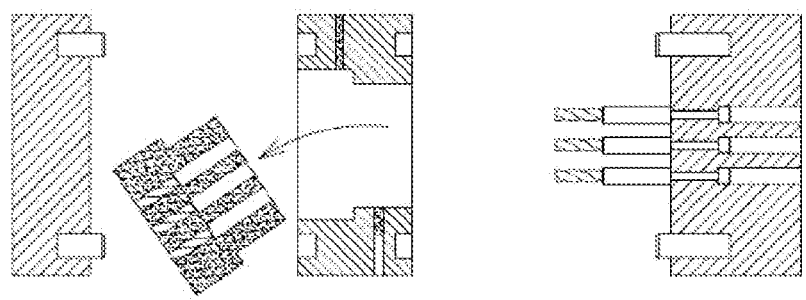

Specific embodiments of the invention will now be described, by way of example, with reference to the accompanying drawings, of which:

FIGS. 1A to 1C show schematically a die for producing extruded products according to an embodiment of the present invention;

FIGS. 2A to 2C show a die for producing extruded products according to a further embodiment of the invention;

FIG. 3 compares the pressure drop observed in particles produced according to Example 1 and Example 2;

FIG. 4 compares the pressure drop observed in particles produced according to Example 1 and Example 4;

FIG. 5 compares the pressure drop observed in particles produced according to Example 1, Example 6 and Example 7;

FIG. 6 illustrates an instance of a die for producing extruded particles of the type shown in FIG. 1;

FIG. 7 illustrates photographically extrusion of particles using a die as shown in FIG. 6;

FIG. 8 illustrates photographically an assemblage of particles extruded using a die as shown in FIG. 6;

FIG. 9 illustrates an instance of a die that is capable of producing extruded particles but that is not an embodiment of the invention;

FIG. 10 illustrates photographically extrusion of particles using a die as shown in FIG. 9;

FIG. 11 illustrates photographically an assemblage of particles extruded using a die as shown in FIG. 9; and FIG. 12 illustrates an exemplary apparatus for producing a die of the form shown in FIGS. 1 and 2; and FIGS. 13A to 13C show the production of a die using the apparatus of FIG. 12.

An embodiment of a die, or extrusion insert, is illustrated in FIG. 1. This embodiment is chosen primarily to provide clear illustration of the operating principles of embodiments on the invention—the die 10 of FIG. 1 has seven channels 18, whereas a typical practical embodiment (as illustrated further below) will have a substantially greater number of channels.

As can be seen from FIG. 1A, each channel has two sections: a first section 11 with a helical bore, and a second section 12 with a substantially cylindrical bore. The helical bore of the first section has in this example a trilobe (TL) form with a cloverleaf cross-section. As will be discussed below, alternative multilobe shapes may be used in the first section of dies according to other embodiments of the invention.

The inlet aperture 13 of each channel includes a small tapered section before the first section 11, whereas the outlet aperture of each channel is simply the end of the second section 12. It is found that adding such a tapered section, short in length compared to the first section 11, improves the overall operation of the die 10. The taper angle may vary between 30° and 60°, but the depth of the taper section needs to be relatively shallow as otherwise it would significantly reduce the possible throughput of the die—inlet apertures 13 of adjacent channels 18 should preferably not touch or overlap. Preferably, there should be a flat region 19 between adjacent inlet apertures 13 which will allow the inlet surface of the die to be scraped clean. It is found that a deeper taper may create "dead" spots, where the extrudate has reduced pitch and may harden and clog the channel. Having the right angle in the tapered section is found to reduce the surface friction inside the die, allowing the extrusion mixture to progress smoothly through it. In this way unwanted features, such as feathering, which are known problems of the existing art can be avoided.

As is shown in FIG. 1C, the use of this approach allows for the production of linear extrudates 17 of regular pitch through the outlet apertures 14 at the outlet surface 16 of the die 10.

Such a die 10 may be used as an extrusion insert in conventional extruder types currently used for the purpose of manufacturing such catalysts. Examples of such extruders are as follows: plunger-type extruder; single screw extruder; or a double screw extruder. Suitable extruders are described in Perry's Chemical Engineers Handbook 7th Edition 18-29 to 18-31.

In a practical application, the total number of extrusion channels per extrusion insert will be increased to increase the overall throughput (though not to a point where the structural integrity of the die will be compromised. This, in general, can allow the maximum practical volumetric or weight based extrusion outlet per extrusion insert per unit time at a given feed rate of extrusion mixture.

Using dies in accordance with embodiments of the invention, the defect rate—defined as the fraction of extrudates showing a pitch significantly greater than that of the nominal design value—is considerably reduced, typically to below 2%. For prior art dies with a helically wound bore, the defect rate is typically 90%, rising in some cases to 100% (meaning that none of the obtained extrudates showed the nominal pitch in its helically wounded shape).

It is found that the length of this extension should be at least twice the inner diameter of the extrusion channel in order to fulfil its role of keeping the alignment of the freshly produced extrudates. Having shorter helical channels after the helically wound section in the extrusion channel resulted in higher than desired defect rate in the final product. As will be discussed further below, it is also advantageous if the cylindrical second section has a larger diameter than the helically wound first section—the second section diameter may beneficially be 10 to 50% bigger than the first section diameter.

The extrusion process is essentially conventional, as is discussed below in the discussion of preparation of catalyst for use in the Fischer-Tropsch process. The only modification required to the process is the use of dies according to embodiments of the invention.

FIG. 2 shows a die 10a according to a second embodiment of the invention. In this arrangement, the two planes in the die (the inlet surface 15 and outlet surface 16) are not parallel, but are at an acute angle to each other. Embodiments have been constructed with 30 and 60° angles between these planes. Provision of a variable length between the channels (in particular, in the second sections) may improve the separation between freshly made extrudates by allowing the removal of some of the extrudates, while keeping the others parallel to the direction of the extrusion. To achieve this, the die has to be placed into the holder in such a way that the skewed outlet section points towards the ground. In these designs, care had to be taken to preserve the minimum length of the cylindrical second section after the helically wound part of the extrusion channel in order to preserve the low defect rate.

In a further embodiment, the die is in a modular form in which the helically bored first section and the cylindrical second section may be separated from each other. The two sections are aligned by the use of pins placed into specific locations on the perimeter of the joining surfaces. During extrusion using these type of inserts it is possible to change the helically wound section quickly while preserving the cylindrical section during extrusion—this may be valuable if the helically wound section becomes blocked. This is especially important for arrangements in which the cylindrical section in integrated into the die holder plate of the extrusion equipment.

The length (absolute, or relative to the cylindrical section) of the helically wound section of the extrusion insert may be changed to achieve different results. This can be significant for the throughput of extrusion (in terms of mass of extrusion mixture per time. In general, at higher throughput a longer helically wound section is desired in the extrusion insert design to ensure that the resulting particles retain the intended helical winding after the extrusion mixture (now in particle shape) has left the die.

It is found to be beneficial for the length of the helically wound section in the die to be at least the length necessary for a full 360° turn in the shape itself. In other words, if the helically wound shape has a pitch of 5 mm along the length of the particle, the die itself should preferably have at least a 5 mm long helically wound section.

Another parameter in improving the die design is control of the total surface area where the extrudates are formed. For a particular shape (form and diameter) it is preferable for as many holes as possible to be present in the die to maximize throughput while keeping the pressure drop across the extrusion insert to the minimum possible for a given extrusion rate.

In a practical die design the maximum number of holes achievable will be determined by the cylindrical section, as it preferred that this has a greater diameter than the helical bore. It is not desirable for there to be any overlap between the cylinders of the cylindrical section.

A series of examples illustrating the use of dies according to the invention will now be provided—the series includes examples that are not in accordance with the invention, and comparisons between the two. In these Examples, the dies are characterised by the following four parameters: the abbreviation for the cross-section of the shape, the diameter of the cross-section of the shape in mm, the pitch of the helix of the extrudate shape and the length of the helical section of the die. In this nomenclature TL1.4R5L9 describes a die with a shape of TL (Trilobe), a diameter of 1.4 mm, rifled with a pitch of 5 mm, where the helical first section of the die is 9 mm long.

EXAMPLES

Example 1

Not According to this Invention

Catalyst particles, denominated as TL1.7, were prepared by extrusion using a conventional die shape containing only a uniform cross-section without helical winding. This results in an extrudate with a uniform cross-sectional shape along the length of the extrudate with no helical form. As indicated above, TL1.7 stands for a particle shape with a Trilobe form, where the particle diameter (the largest cross section possible) is 1.7 millimeters.

Example 2

According to Embodiments of this Invention

Catalyst particles, denominated as TL1.7R12, were prepared by extrusion using dies of the type described above with reference to FIGS. 1 and 2. As indicated above, TL1.7R12 stands for a particle shape with a Trilobe form, where the particle diameter is 1.7 millimeters, with a helically wound shape having a pitch of 12 mm.

Example 3

Comparison

The initial long strands of catalyst particles were broken up by hand and sieved to result in an average particle length around or below 5 mm. The particle size distribution was measured with Camsizer. The particle size distribution followed in all cases a normal distribution curve.

The particles were loaded at identical loading speed expressed in weight in time into a transparent glass tube of 2.56 cm internal diameter and 5.15 cm2 cross section with a bed height of at least 400 mm. The particles were supported on a porous fret placed at the bottom of the tube. From the loaded weight and the bed length, an apparent bed density was calculated.

The loaded tube was connected at the bottom to a compressed nitrogen source and a mass flow controller. The pressure drop was measured by measuring the pressure below the fret in the tube in the full range of the mass flow controller (from 2 to 5400 l/hour throughput corresponding to 0.001 to 2.9 m/s linear flow), and corrected by the pressure drop of the empty tube. The pressure drop value at 50% flow rate was taken, and normalized by the length of the particle bed length.

The pressure drop was measured at various average particle lengths, and the normalized pressure drop has been plotted accordingly.

For the catalyst samples from Example 1 and Example 2, a comparison can be made, as shown in the FIG. 3, plotting the normalized pressure drop (DP/L) vs. the average particle length (APL).

The comparison reveals a considerably lower pressure drop in the case of the helically wound extrudate shape compared to the non-helically wound extrudate shape at a given average particle length. Alternatively, at a given pressure drop, with the helically wound extrudates a less stringent minimal length target is required, so the same pressure drop can be achieved with a lower APL value.

Example 4

According to Embodiments of the Invention

Catalyst particles, denominated as TL1.2R4 and TL1.2R12, were prepared by extrusion using two different dies with containing helically wound sections resulting in helically wound extrudate shapes. TL1.2R4 stands for a particle shape with a Trilobe form, where the particle diameter is 1.2 millimeters, with a helically wound shape having a pitch of 4 mm—TL1.2R12 is of the same form, but the pitch is longer at 12 mm.

Example 5

Comparison

The initial catalyst samples were treated, and measurements of the particle length average and its distribution taken, as described above in Example 3. The results are shown in FIG. 4.

The catalyst with the shortest pitch shows the best performance at a given average particle length in terms of normalized pressure drop. This is particularly significant, as for a smaller shape diameter (the difference between TL1.7 and TL1.2 being significant), one would expect somewhat higher pressure drop due to the increase in the apparent bed density with decreasing diameter.

Example 6

Not According to this Invention

Catalyst particles, denominated as TL1.7, were prepared by extrusion using a die containing only linear, and thus no helically wound, sections resulting in non-helically wound extrudate shapes.

In our nomenclature, TL1.7 stands for a particle shape with a Trilobe form, where the particle diameter (the largest cross section possible) is 1.7 millimeters.

Example 7

According to this Invention

Catalyst particles, denominated as TA1.7R12, were prepared by extrusion using dies containing helically wound sections resulting in helically wound extrudate shapes in the TA shape as described in WO03/013725A1. TA1.7R12 stands for a particle with a TA particle shape, where the particle diameter is 1.7 millimeters, with a helically wound shape having a pitch of 12 mm.

Example 8

Comparison

The initial catalyst samples were treated, and measurements of the particle length average and its distribution taken, as in Example 3. The results are shown in FIG. 5.

The test results revealed that the TA shape without helical winding does not provide a substantial relief in pressure drop at the given average particle length compared to the non-rifled TL shape, despite the considerable differences in the total area of the cross section at a given diameter. The rifled extrudate shape, on the other hand, reduces the pressure drop at a given APL significantly compared to both the non-rifled TA and the non-rifled TL shape.

Example 9

According to Embodiments of the Invention

An extrusion insert was prepared with the following layout in terms of the direction of extrusion: a helically wound section preceded by a small tapered section, and followed by a cylindrical section (as shown in FIG. 6). The extrusion holes had a Trilobe shape, with a diameter of 1.2 mm. The helically wound section had a pitch of 6 mm and a length of 7 mm. The cylindrical section was 12.5 mm in length, giving a total die length of 20 mm.

Catalyst particles were prepared using this die, as is shown photographically in FIG. 7. During extrusion the catalyst particles produced formed linear sticks (with the helically wound shape) without excessive intermingling between the catalyst bodies exiting the extrusion insert. The particles, once broken off from these sticks, formed a stacking pattern predominantly consisting of independent linear bodies (as shown in FIG. 8). The particles retained a straight helically wound form with substantially uniform pitch.

Example 10

Not According to the Invention

A die was prepared with a helically wound section followed (in the direction of extrusion) by a cylindrical section (as shown in FIG. 9). The extrusion holes had a Trilobe shape, with a diameter of 1.2 mm. The helically wound section had a pitch of 6 mm and a length of 7 mm. The cylindrical section was 2.5 mm in length, giving a total die length of 9.5 mm.

Catalyst particles were prepared using this die. During extrusion the catalyst particles prepared did not form linear sticks when exiting the die (see FIG. 10). Instead, they formed an intermingled mass of particles in which the individual strands are touching each other, causing severe deformation to the extruded particle stream. The particles did not break off from the die individually, but fell together in large clumps. The resulting catalyst bodies were not straight, but showed a three-dimensional curvature and the helically wound shapes did not have a uniform pitch—this is shown in FIG. 11.

Without a sufficient cylindrical extension to the die, it proved not to be possible to prepare catalyst particles which were sufficiently uniform in straightness or pitch. This lack of uniformity prevents such catalyst particles from achieving the benefits that would be calculated to result for the designed catalyst shape.

Example 11

According to this Invention

Catalyst particles, denominated as TL1.7R12, were prepared by extrusion using an extrusion insert with a cylindrical extension of 4.9 times the helically wound section length having a structure shown in FIG. 1A (parallel inlet and outlet planes).

In the nomenclature used in this specification, TL1.7R12 stands for a particle shape with a Trilobe form, where the particle diameter is 1.7 millimeters, with a helically wound shape having a speed of 12 mm for a full 360° rotation along the length of the particle.

Example 12

According to this Invention

Catalyst particles, denominated as TL1.2R4, were prepared by extrusion using an extrusion insert having an inlet and outlet plane at an acute angle to each other as shown in FIG. 2B. In this case, plane 16a had an angle of 25° to plane 15. The cylindrical section was 4.9 times the length of the helically wound section.

In the nomenclature used in this specification, TL1.2R4 stands for a particle shape with a Trilobe form, where the particle diameter is 1.2 millimeters, with a helically wound shape having a pitch of 4 mm for a full 360° rotation along the length of the particle.

Example 13

According to this Invention

Catalyst particles, denominated as TL1.2R4 according to the aforementioned nomenclature, were prepared by extrusion using an extrusion insert having a form shown in FIG. 2B. In this case, plane 16 was disposed at an angle of 55° to plane 15, and the cylindrical section was 10 times the length of the helically wound section.

Example 14

According to this Invention

Catalyst particles, denominated as TL1.2R4 following the aforementioned nomenclature, were prepared by extrusion using an extrusion insert having a form shown in FIG. 2B, with plane 16 disposed at an angle of 70° to plane of 15 and with a cylindrical section 13.3 times the length of the helically wound section.

Example 15

Catalytic Testing

Dried and calcined catalyst samples of Example 1 (TL1.7) and Example 9 (TL1.2R6L7) were subject to a catalytic test under conditions resembling actual large-scale operation in an industrial plant. The test was carried out in a small-scale catalytic unit with an internal diameter of 15 mm and a total bed length of approximately 40 mm, giving a useful catalyst volume of approximately 10 ml in the reactor.

Each catalyst sample was loaded into the reactor in its calcined, oxidic form. Prior to the reaction, the catalyst was reduced in a flow of hydrogen and nitrogen mixture by increasing the reactor temperature from room temperature to a maximum of 300° C. At elevated temperatures sufficient time was allowed to pass so that the catalytically active components were in their fully reduced state at the end of the reduction procedure. The reduction mixture was then turned off, and the catalyst was exposed to the flow of hydrogen and carbon monoxide, where the total pressure was balanced with inert nitrogen.

The catalytic activity of the reduced samples was tested at elevated pressures up to 60 bar, with an inlet molar ratio of H2/CO not exceeding 2.0, but higher than 0.6. By adjusting the weight hourly space velocity of the gas mixture, the conversion was kept suitably low so kinetically meaningful data could be acquired. Typically a gas space velocity higher than 1000 kg gas/kg catalyst/hour was used in the test. Due to the conversion, the H2/CO ratio decreases in the reactor, but the exit ratio was not allowed to fall below 0.5.

Three key performance indicators were selected to evaluate advantages provided by the rifled extrudate shape of Example 9 relative to the non-rifled form of Example 1. The first performance indicator is derived from the total hydrocarbon yield measured at a given conversion level. Expressed as an activity factor, the hydrocarbon yield is normalized to the lined-out activity of a catalyst under actual operational conditions after several thousands of hours on stream. Because of the relatively short duration of the current test, all activity factors are above 1.0. Nevertheless, the differences in performance are still evident if one catalyst shows a higher activity factor compared to another. Because of inherent variations in the test, any difference in the activity factors above 5% relative should be considered significant.

The second performance indicator is selectivity towards heavier hydrocarbons. Typically during Fischer-Tropsch synthesis one would be interested in making hydrocarbons with carbon atoms of at least 5 of higher, these products being more valuable. The C5+ selectivity expresses the molar fraction of molecules having a carbon chain of 5 or higher atoms vs. the total amount of hydrocarbons produced over the catalyst, from C1 onwards. A higher C5+ selectivity is preferred, as this translates into higher amount of desired heavy hydrocarbons in the product. Because of inherent experimental variability, any difference in the C5+ selectivities above 0.5% absolute should be considered relevant.

The third performance indicator is selectivity towards the production of CO2. As CO2 is an undesired side product, the lower the CO2 selectivity is, the more selective the catalyst is towards making hydrocarbons from the available CO and H2 in the feed. Because of experimental uncertainty, any difference in the CO2 selectivities above 0.2% absolute should be considered significant.

These three performance parameters are compiled in Table 1 for Example 1 (not according to the invention) and Example 9 (according to the invention) from a catalyst test as described above at times on streams above 400 hours. The relative amounts with respect to the performance of the catalyst from Example 1, denoted as Delta, are also shown.

TABLE 1

|  | Example 1 | Example 9 | Delta |
|---|---|---|---|
| Activity factor | 1.24 | 1.35 | 109% |
| $C_{5+}$ selectivity (mol %) | 89.7 | 91.1 | 101.5% |
| $CO_2$ selectivity (mol %) | 1.8 | 1.2 | 63% |

Table 1: Activity factor, $C_{5+}$ selectivity and $CO_2$ selectivity of catalysts measured in a catalytic test resembling industrially relevant Fischer-Tropsch synthesis conditions.

It is clear from Table 1 that the catalyst from Example 9 outperforms the catalyst from Example 1. It showed 9% high activity under identical conditions and identical time on stream, at a 1.5% higher selectivity to C5+ hydrocarbons, while producing 0.6% absolute, close to 40% relative, less CO2 from the available CO in the feed.

Catalyst Shapes

The Examples discuss embodiments of the invention in which the TL and TA shapes are used in a helically wound form. As the skilled person will appreciate, other shapes may be used in other embodiments of the invention—the requirements for use of a given shape are that it is possible to produce a helically wound section of channel to produce the required shape, and that the material to be extruded will pass effectively through such a section to form extrudate. The possible shapes are not limited to trilobes—other multilobe shapes, such as for example those described in U.S. Pat. Nos. 3,857,780 and 3,966,644, may also be used. The extreme trilobe (TX) shape disclosed in WO2003/013725 and WO2003/103833 may also be used, for example.

Manufacture of Dies

Dies may be made from any sufficiently robust material which does not react with the materials used to produce the extrudate and which can be machined effectively into the desired shape—thermoplastic resins are one appropriate material type.

Dies can be made from prefabricated templates, in which the helically wound extrusion channels are not originally present, by cutting in the helically wound channels with suitable equipment. Care has to be taken to fully align the inward and outward motion and rotation of the drilling heads so as not to destroy the helically wound extrusion channels during the removal of the drilling heads from the bored dies.

Alternatively, by following the teaching of EP-291682 B1, an injection moulding procedure can be used. This employs helically wound pins that can be removed from the resulting die without damaging the resulting helically wound sections of the channels after the hardening of the material used during the moulding procedure. The pins have to be either rotatable, so that the extrusion insert can be injected from the mold by compressed air or other means, or easy to unscrew from the mold by the help of gears, lugs, or other suitable mechanical devices.

A further modified apparatus is shown in FIG. 12. A mould unit has a main mould section 21 between a base 20 and a cover 22. The die is formed in the mould cavity 23, with resin material injected through injection line 29, with air vented out through vent 28. Pins 24 are used to form the helical bore sections of the die, the pins having a helical section 25 extending from a cylindrical section 26 of the pin ending in a flange 27.

The process of moulding is shown in FIGS. 13A to 13C. FIG. 13A shows that resin material is injected through injection line 29 and air vented through vent 28.

When the mould has set, the pins 24 are unscrewed from the mould using the flanges 27 and both the base 20 and the cover 22 separated from the main mould section 21 and the moulded die 30 (FIG. 13B). The moulded die is then pressed or otherwise urged out of the main mould section 21 (FIG. 13C).

Catalyst Preparation and Fischer-Tropsch Process

The extrudate produced using the methods and apparatus described here has a range of uses, and is particularly suitable for use in mass transfer limited reactions generally. Embodiments of the invention may be used, however, to produce catalysts for a wide range of reactions (including, for example, hydrocracking and hydroprocessing). While embodiments of the present invention have a wide range of uses, a particular use considered here is for the Fischer-Tropsch process.

The preparation of particles for use in a Fischer-Tropsch process will now be described, together with a description of a Fischer-Tropsch process using such particles. The skilled person will appreciate how this may be modified with reference to the existing literature on Fischer-Tropsch processes.

The current invention relates to a process for performing a Fischer Tropsch reaction comprising the following steps:

providing syngas to a reactor, said reactor comprising catalyst particles that have been produced by extruding a paste comprising (i) a porous refractor oxide, (ii) a liquid, and (iii) a metal compound, said extrusion having been performed using a die comprising a plurality of channels extending from an inlet to an outlet, wherein from the inlet to the outlet each channel comprises a first section with a helical bore with a non-circular cross-section, and a second section with a cylindrical bore which has a diameter equal or greater than that of the first section, wherein the second section is at least twice as long as a diameter of the first section;

providing the following process conditions in the reactor: a temperature in the range from 125 to 350° C., and a pressure in the range from 5 to 150 bar absolute, and a gaseous hourly space velocity in the range from 500 to 10000 Nl/l/h removing Fischer Tropsch product from the reactor.

As previously indicated, the catalytically active component is preferably a Group VIII metal, such as ruthenium, iron, nickel and particularly cobalt.

When the metal is added before extrusion, the following steps may take place to form the paste: mixing (i) porous refractory oxide, (ii) a liquid, and (iii) a metal compound, which is at least partially insoluble in the amount of liquid used, to form a mixture.

Any metal compound such that at least 50% by weight is insoluble in the amount of liquid used can be suitable for use in the process described here—preferably this percentage is greater. Examples of suitable metal compounds include metallic powder, metal hydroxide, metal oxide or mixtures of the above (for example, $Co(OH)_2$ and $Co_3O_4$).

The amount of metal compound present in the mixture may vary widely. Typically, the mixture comprises up to 60 parts by weight of metal (metal, rather than metal compounds) per 100 parts by weight of refractory oxide, preferably 10-40 parts by weight.

An optimum amount of catalytically active metal will depend on the identity of the metal used. For cobalt, this may range from 1 to 100 parts by weight (preferably 3 to 50 parts by weight) of cobalt by 100 parts by weight of support material.

One or more metal promoters or co-catalysts may be present in the paste, or added after extrusion.

The promoters may be present as metals or metal oxides, depending on the particular promoter used. Suitable promoters include oxides of metals from Groups IIA, IIIB, IVB, VIIB and/or VIIB of the Periodic Table, oxides of the lanthanides and/or the actinides. Preferably, the catalyst comprises at least one of an element in Group IVB, VB, VIIB and/or VIII of the Periodic Table, with titanium, zirconium, manganese and vanadium (particularly manganese and vanadium) as preferred choices. The catalyst may comprise a metal promoter selected from Groups VIIB and/or VIII of the Periodic Table as an alternative to, or in addition to, a metal oxide promoter. Preferred metal promoters include rhenium, platinum and palladium.

The promoter, if present in the catalyst, is typically present in an amount from 0.001 to 100 parts by weight per 100 parts of support material, preferably 0.05 to 20, more preferably 0.1 to 15. An optimum value will vary depending on the specific promoter used.

The refractory metal oxide may be a porous support material such as silica, alumina, titania, zirconia, ceria, gallia and mixtures and precursors thereof, especially silica or titania. A silica precursor tetraethyl orthosilicate (TEOS) may be used, for example.

To improve the flow properties of the mixture, it is preferred to include one or more flow improving agents or extrusion aids in the mixture prior to extrusion. Suitable additives for inclusion in the mixture include fatty amines, quaternary ammonium compounds, polyvinyl pyridine, polyvinyl alcohol, sulphoxonium, sulphonium, phosphonium and iodinium compounds, alkylated aromatic compounds, acyclic monocarboxylic acids, fatty acids, sulphonated aromatic compounds, alcohol sulphates, ether alcohol sulphates, sulphated fats and oils, phosphonic acid salts, polyoxyethylene alkylphenols, polyoxyethylene alcohols, poly oxyethylene alkylamines, polyoxyethylene alkylamides, polyacrylamides, polyols and acetylenic glycols. Preferred additives are sold under the trade marks Nalco and Superfloc. Another suitable extrusion aid is methylcellulose.

It is desirable to include in the mixture, prior to extrusion, at least one compound which acts as a peptising agent for the refractory metal oxide. This provides stronger extrudates. Suitable peptising agents for this purpose are well known in the art and include both basic and acidic compounds. Suitable basic compounds include ammonia, ammonia-releasing compounds, ammonium compounds or organic amines. Such basic compounds are released upon calcination and are not retained in the extrudates, as this may impair the catalytic performance of the final product. Preferred basic compounds are organic amines (ethanol amine is particularly suitable) or ammonium compounds. Suitable acidic peptising agents include weak acids such as formic acid, acetic acid, citric acid, oxalic acid and propionic acid.

Optionally, burn-out materials may also be included in the mixture prior to extrusion to create macropores in the resulting extrudates—suitable burn-out materials are commonly known in the art.

The total amount of such additional materials (flow improving agents, extrusion aids, peptising agents and burn-out materials) in the mixture is preferably in the range of 0.1 to 20% by weight (more preferably 0.5 to 10%) with respect to the total weight of the mixture.

Other additives, for example a binder such as that sold under the trade mark Tyzor, may be included in the paste.

The constituents in the paste are mixed together before extrusion. This may be carried out by kneading or mulling. The solids content of the paste may be from 30 to 90% by weight, but preferably from 50 to 80%. Mixing may take place for 1 m to 4 h, preferably 5 m to 2 h, more preferably 10 m to 1 h, especially around 15 m. The mixing temperature may be in the range of 15-60° C., preferably 20-45° C.

The liquid used is preferably water, although other liquids may be used—C1 to C4 alcohols, particularly methanol, ethanol or propanol; ammonia; ethers such as MTBE; ketones such as acetone or MEK; aldehydes such as propanal; and aromatic solvents such as toluene; or mixtures of these.

Following extrusion through the dies of the extruder, the temperature of the paste is generally increased by friction (typically to 40 to 70° C., most normally 50 to 60° C.) and some of the liquid is evaporated. A strong and flexible extrudate results.

The extruder itself may be of any suitable type, as has been discussed above: plunger-type extruder; single screw extruder; or a double screw extruder. Suitable extruders are described in Perry's Chemical Engineers Handbook 7th Edition 18-29 to 18-31.

After extrusion, the extrudate is typically subjected to drying and/or calcination at a temperature of generally 350 to 750° C. (preferably 450 to 550° C.). The effects of calcination are to remove crystal water, to decompose volatile decomposition products and to convert any organic and inorganic compounds to their respective oxides.

Where not previously included, the catalytic metal and/or the promoter are added to the dried and/or calcined extrudate, optionally followed by drying and/or calcination. The drying temperature is typically between ambient temperature and 150° C.

The resulting catalyst or catalyst precursor is usually activated by contacting the catalyst with hydrogen or a hydrogen-containing gas, typically at temperatures of 200 to 450° C.

A particularly preferred catalyst comprises a titania support with a cobalt active metal and a manganese promoter. One suitable support material is provided under the trade mark P25 Degussa. A process for the preparation of such catalysts is described in EP1042067, the disclosure of which is incorporated herein its entirety by reference to the extent permitted under applicable law.

Preferably the BET surface area for the catalyst support following calcination at 550° C. for 2 hours is 5-1000 m2/g (preferably 10-450 m2/g, still more preferably 30-100 m2/g).

The Fischer-Tropsch process will now be described in more detail—this process is well known to the skilled person in this art and is discussed extensively in the technical literature. The process involves synthesis of hydrocarbons from syngas by contacting the syngas under reaction conditions with a Fischer-Tropsch catalyst.

The syngas can be produced in any suitable manner taught in the art, most typically by partial oxidation and/or reforming of a hydrocarbonaceous feedstock. Various processes are known for producing mixtures of primarily carbon monoxide and hydrogen from partial oxidation of such gaseous feedstocks. One such process is the Shell Gasification Process, discussed in the Oil and Gas Journal, Sep. 6, 1971, pp 86-90.

To adjust the hydrogen to carbon monoxide ratio in the syngas, carbon dioxide and/or steam may be introduced in the partial oxidation process. This may be up to 15% by volume (preferably up to 8%, more preferably up to 4%) of either carbon dioxide or steam added to the feed. Water produced in the hydrocarbon synthesis may be used to generate the steam. A suitable source of carbon dioxide is from the effluent gases of the expanding/combustion step. The H2/CO ration of the syngas is suitably between 1.5 and 2.3, preferably 1.6 to 2.0. Small additional amounts of hydrogen may be made by steam methane reforming, preferably in combination with the water gas shift reaction, if desired. Any carbon monoxide and carbon dioxide produced together with the hydrogen may be used in the gasification and/or hydrocarbon synthesis reaction or recycled to increase the carbon efficiency. Use of hydrogen from other sources may also be considered.

The syngas may include nitrogen, carbon dioxide and/or steam in addition to the predominant constituents of hydrogen and carbon monoxide. The syngas is contacted with a suitable catalyst (as discussed above) in the catalytic conversion step, in which the hydrocarbons are formed. Suitably at least 70 v/v % (preferably at least 80%, more preferably at least 90% and most preferably all of it) of the syngas is contacted with the catalyst.

The preferred synthesis temperature range is 125-350° C., more preferably 175-275° C. and most preferably 200-260° C. The preferred synthesis pressure range is 5-150 bar abs., preferably 5-80 bar abs. The gaseous hourly space velocity preferably is in the range from 500 to 10000 Nl/l/h.

The Fischer-Tropsch tail gas may be fed back into the partial oxidation process.

The Fischer-Tropsch process may be carried out in a fixed bed regime, particularly a trickle flow regime. As indicated above, a multitubular fixed bed reactor is particularly suitable for this process.

Products of Fischer-Tropsch synthesis may range from methane to heavy paraffin waxes. Preferably C5+ hydrocarbons are at least 60% by weight (more preferably at least 70%, even more preferably at least 80%, and still more preferably at least 85%).

The hydrocarbons produced in the process are suitably C3-200 hydrocarbons, more suitably C4-150 hydrocarbons and especially suitably C5-100 hydrocarbons (or mixtures thereof). These hydrocarbons, or mixtures thereof, are liquid or solid at temperatures between 5 and 30° C. at 1 bar (particularly at 20° C.) and are usually paraffinic in nature. Up to 30% by weight (preferably up to 15%) of either olefins or oxygenated compounds may be present.

While this is dependent on the choice of catalyst and process conditions, typically some proportion of normally gaseous, normally liquid and normally solid hydrocarbons results. It may be preferred to obtain a large fraction of normally solid hydrocarbons—possibly up to 90 wt %, usually 50-80 wt %.

Preferably the catalyst is chosen to provide yields of substantial quantities of paraffins, especially substantially unbranched paraffins. A part may boil above the boiling point mage of the so-called "middle distillates"—this term is used to refer to hydrocarbon mixtures of which the boiling point range corresponds substantially to that of kerosene and gasoil fractions obtained in a conventional atmospheric distillation of crude mineral oil. The boiling point range of middle distillates generally lies within the range of about 150° C. to about 360° C.

The higher boiling point range paraffinic hydrocarbons, if present, may be isolated and subjected to a catalytic hydrocracking step, which is known per se in the art, to yield the middle distillates. The catalytic hydrocracking is carried out by contacting the paraffinic hydrocarbons at elevated temperature and pressure in the presence of hydrogen with a catalyst containing one or more metals having hydrogenation activity, and supported on a carrier having an acidic function. Suitable hydrocracking catalysts include catalysts comprising metals selected from Group VIB and Group VIII, preferably one or more noble metals from Group VIII, with platinum, palladium, rhodium, ruthenium, iridium and osmium as preferred choices, platinum being particularly preferred. The amount of catalytically active noble metal present in the catalyst may lie typically in the range of about 0.05 to about 5 parts per weight per 100 parts by weight of the carrier material. Preferably there will be non-noble metal present in the range of 5-60%, preferably 10-50%.

Suitable conditions for hydrocracking are well known in the art. Typically the temperature range will be from about 175-400° C., and typical hydrogen partial pressures applied from about 10 to 250 bar.

The product of the hydrocarbon synthesis and consequent hydrocracking suitably comprises mainly normally liquid hydrocarbons, along with some water and normally gaseous hydrocarbons. By selecting the catalyst and the process conditions to obtain primarily normally liquid hydrocarbons, the product obtained ("syncrude") may be transported in the liquid form or be mixed with any stream of crude oil without creating any problems as to solidification or crystallization of the mixture.

Aspects of the invention relate to producing of such hydrocarbon products by a process employing catalysts comprising extrudates manufactured by the processes and with the apparatus described above. Such hydrocarbon products may be a fuel, such as naphtha, kerosene or gasoil, a waxy raffinate or a base oil.

Any percentage mentioned in this description is calculated on total weight or volume of the composition, unless indicated differently. When not mentioned, percentages are considered to be weight percentages. Pressures are indicated in bar absolute, unless explicitly indicated otherwise.

Embodiments of the present invention relate to methods and apparatus for extrusion of particles, in particular embodiments particles for use in catalysis, and in more particular embodiments catalysts for use in a Fischer-Tropsch process. Embodiments also relate to catalysts produced with such method and apparatus and the products of use of such catalysts.

Improvements and modifications may be made without departing from the scope of the invention.

What is claimed is:

1. A process for performing a Fischer Tropsch reaction comprising the following steps:
providing syngas to a reactor,
said reactor comprising catalyst particles that have been produced by extruding a paste comprising (i) a porous refractor oxide, (ii) a liquid, and (iii) a metal compound,
said extrusion having been performed using a die comprising a plurality of channels extending from an inlet to an outlet, wherein from the inlet to the outlet each channel comprises a first section with a helical bore with a non-circular cross-section, and a second section with a cylindrical bore which has a diameter equal or greater than that of the first section, wherein the second section is at least twice as long as a diameter of the first section;
providing the following process conditions in the reactor: a temperature in the range from 125 to 350° C., and a pressure in the range from 5 to 150 bar absolute, and a gaseous hourly space velocity in the range from 500 to 10000 Nl/l/h;
removing Fischer Tropsch product from the reactor.

2. The process as claimed in claim 1, wherein the first section of the die has a helical trilobal form.

3. The process as claimed in claim 1, wherein a length of the first section of the die is at least equal to a pitch of the helical bore.

4. The process as claimed in claim 1, wherein the second section of the die is substantially circular in cross-section.

5. The process as claimed in claim 1, wherein each channel of the die further comprises between the inlet and the first section a tapered inlet section wider at the inlet than at the first section, wherein an angle of taper for the tapered inlet section is between 30 degrees and 60 degrees.

6. The process as claimed in claim 1, wherein each channel of the die is separated from each adjacent channel by a land at both the inlet and the outlet.

7. The process as claimed in claim 1, wherein the diameter of the second sections of the channels of the die is 10 to 50% greater than the diameter of the first section of the channels.

8. The process as claimed in claim 1, wherein the inlet of the die forms an inlet plane, and the outlet of the die forms an outlet plane, and wherein the inlet plane and the outlet plane are not parallel.

9. The process as claimed in claim 1, wherein the die is provided in two or more modules which may engaged with or detached from each other, such that the first section of each channel is provided in one module and the second section of each channel is provided in another module.

* * * * *